March 12, 1935.   A. E. BROWN ET AL   1,993,915
MECHANISM FOR ASSEMBLING CARTONS
Filed Nov. 23, 1933   9 Sheets-Sheet 8

Inventors:
Arthur Edmund Brown
and William Vaughan,
By Canning Byrning
Attys.

Patented Mar. 12, 1935

1,993,915

UNITED STATES PATENT OFFICE 1,993,915

MECHANISM FOR ASSEMBLING CARTONS

Arthur Edmund Brown and William Vaughan, London, Ontario, Canada, assignors to Leon Benoit, New York, N. Y.

Application November 23, 1933, Serial No. 699,392

23 Claims. (Cl. 93—37)

The mechanism of the present invention is designed primarily for the purpose of assembling egg cartons of the style and character which when set up provide for two rows of separated compartments arranged on opposite sides of a medial double walled partition in conjunction with closing flaps which are adapted to be folded over the respective rows of compartments to provide separate covers for the rows of eggs. In cartons of this character it is customary to construct the body of the carton from a single sheet of paper board, and to insert the separate cross walls constituting the cross divisions through registering slots formed in the medial double walled partition, so that each cross wall extends oppositely from the medial partition and serves to separate the compartments on opposite sides thereof. A carton of the general style involved is set forth and described in Letters Patent of the United States No. 1,768,023, issued June 24, 1930, to Leon Benoit.

In the shipment of cartons of this general character it is customary to properly score the body of the carton and to insert therethrough a set of cross walls, and to nest the cross walls into flatwise or overlapping relation, and to turn down the upper portion of the carton body thereover into flatwise or knock-down relation, so that a consignment of cartons will occupy but a small space during shipment. In setting up such a carton, the cross walls are spread into transverse relation and hooked into the walls of the carton in the intended manner to provide the rows of compartments, after which the eggs are inserted and the cover flaps folded over the top to enclose the package.

The present invention relates to the method which includes the feeding forward of previously slotted and scored carton blanks which are doubled along their medial folding line presenting a double wall thickness, the slots in each wall being in registration; feeding out a set of cross walls, and advancing them in edgewise relation toward and through the registering slots; nesting the inserted cross walls to overlap one another; folding down the upstanding portions of the carton blank to overlie the nested cross walls; and finally feeding and stacking the cartons for packaging and shipment, and to the various manipulations involved in the sequence of operations above described.

In order to insert the cross walls, it is necessary to feed forward and manipulate the carton blanks with the utmost precision and to guide the cross walls to the slots; and in view of the fact that the slots are but slightly wider than the thickness of the cross walls, it is necessary to accurately position and hold the parts during the inserting operation, and the mechanism of the present invention is designed to meet these requirements and to rapidly and accurately assemble and deliver the cartons and to automatically perform most of the operations involved without the necessity for human manipulation.

The invention further involves the use of synchronized mechanisms so constructed and arranged as to perform the several operations in sequence and in timed relation, and to at all times guide and hold the cartons and the partitions in such a way as to avoid the possibility of displacement or failure of registration even when operating at a high rate of speed.

Further objects and details will appear from a description of the invention in conjunction with the accompanying drawings, wherein—

The carton herein shown is of the type which utilizes a carton blank $p$ which has previously been slotted and scored, and a plurality of cross walls $w$ which provide end and intermediate partitions in the assembled carton. The carton blank is folded along a medial score line $a$ forming a V-shaped blank in which the outwardly extending sides may be termed wings, each being bent along score lines $b$, $c$ and $d$. These score lines divide the carton blank into two duplicate divisions, and when the carton is ultimately assembled, each section will assume a trough-shaped configuration with the score line $b$ constituting the inverted ridge of the carton, with the section $e$ subtended between the score lines $b$ and $c$ constituting the oblique outer wall, with the section $f$ subtended between the score lines $c$ and $d$ constituting the top, and with the marginal section beyond the score line $d$ constituting a flap to tuck in for the purpose of closing the carton, as clearly illustrated in Fig. 4.

The carton blank is provided with slots $g$ which traverse the score lines $b$, each wing section on opposite sides of the medial score line being similarly punched. The blank is further punched at the medial score line $a$ with half-circular notches $h$ which being cut along the medial line constitute circular holes in the complete carton blank.

Figure 1:
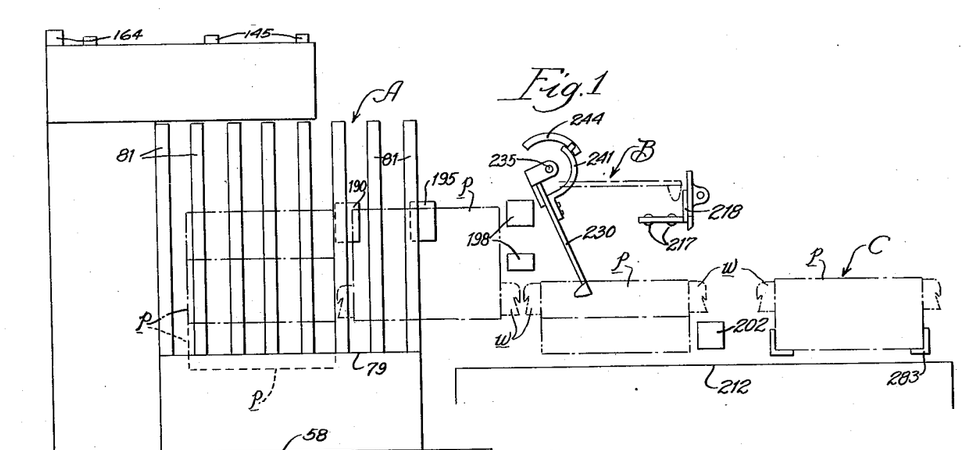
Figure 1 is a diagrammatic side view of the mechanisms involved in the feeding and insertion of the cross walls through the folded carton blanks and in the final folding and stacking of the blanks.
Figures 2, 4:
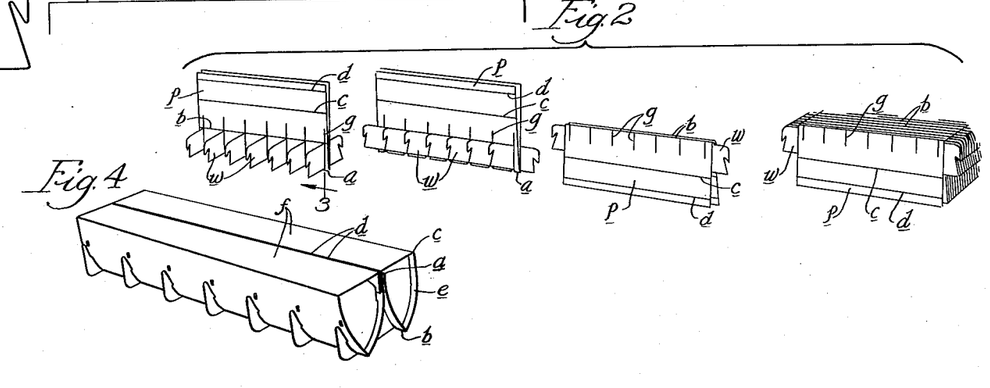
Fig. 2 is a perspective view showing the formation of the blanks and cross walls at the several stages of progress through the mechanisms of Fig. 1.
Fig. 4 is a perspective view of a carton completely assembled and with the covers closed.
Figure 3:
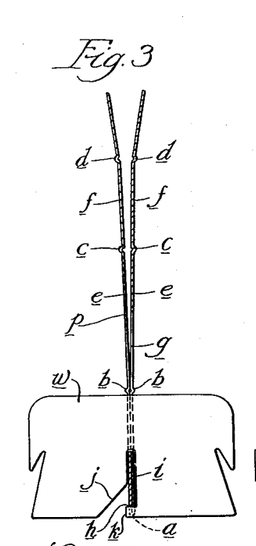
Fig. 3 is a cross sectional view on line 3 of Fig. 2, showing a carton blank having a cross wall inserted therethrough.

The operations to be performed are those set forth in the mechanism which is diagrammatically illustrated in Fig. 1, and during the progress therethrough the cartons successively assume the formations illustrated in Fig. 2. The operations include the feeding forward and inserting of certain cross walls $w$, which operation is performed in the assembling mechanism A, and as the cartons are discharged from the assembling mechanism, the inserted cross walls are bent down or nested upon one another, as shown in the second position in Fig. 2, after which the carton blanks are fed through a folding mechanism B, which folds down the previously upstanding portions of the carton blanks, as shown in the third position in Fig. 2, after which the cartons are fed to a stacker C and ultimately delivered therefrom for final packaging and shipment.

The assembling mechanism is best illustrated in Figs. 5 to 15 inclusive, and this mechanism comprises two groups of instrumentalities in coacting relation with one another, one of which is provided for introducing the folded and slotted blanks and for standing each of the blanks on its folded edge and clamping it in position to receive a group of transversely fed cross walls. The other instrumentality is concerned with the feeding and inserting of the cross walls through the slots, after which the assembled carton is advanced and the cross walls laid down into overlapping relation to one another in preparation for the folding operation performed by the folding mechanism B.

The folded carton blanks are laid flatwise within an open hopper comprising angular corner posts 50 and an adjustable gate 51. The floor of the hopper is provided in part by an obliquely disposed slide plate 52 shouldered at 53, and in part by a flat front floor plate 54.

The slide plate 52 is mounted upon a web 55 slidably mounted within a guide plate 56 carried by a standard 57 resting upon a table 58 supported upon legs 59. The slide plate is operated by a lever 60 pivoted at 61, the upper end of which is connected by means of a link 62 with an ear 63 depending from the web of the slide plate. A pitman 64 is pivoted at the lower end of the lever and the pitman is operated by a cam 65 carried by a shaft 66.

The folded and slotted carton blanks are fed singly from the bottom of the stack through the opening below the gate 51 into the bite of rollers 67, which advance the cartons inwardly from the side of the machine with the folded edge foremost, as indicated in full lines in Fig. 7. With the carton blank thus positioned and lying flatwise, it is tilted upwardly upon its folded edge by the action of a swinging finger 68 mounted upon a rock shaft 69 journalled upon standards 70. Side plates 71 furnish a trough-like receptacle for the cartons and hold them accurately positioned during the upending operation. Each carton is moved inwardly until its folded edge abuts against a stop plate 72, which is provided with a top flange 73 and a base flange 74 resting upon the table 58. The finger 68 is operated by the cam 75 and connections shown in Fig. 9.

The stop plate 72 carries a pair of horizontally extending guide rods 76, which are widely spaced from one another the required distance to register with the end half-circular notches formed in the folded lower edge of the carton blanks, so that as the latter are upended, the notches will register with the upper rounded surfaces of the rods, which thus serve to accurately position the carton blanks with the slots in position to receive the cross wall blanks when fed transversely to the plane of the upended carton blank. Lugs 77 extend from the upper surface of the rods providing stops to prevent the blank from falling from vertical position until it has been gripped by mechanism presently to be described.

The feed rollers 67 are power-driven through the medium of chain and sprocket mechanism 78 driven from the shaft 66, the two rollers being in train with one another so that both are power-driven.

Figures 10, 11, 12:
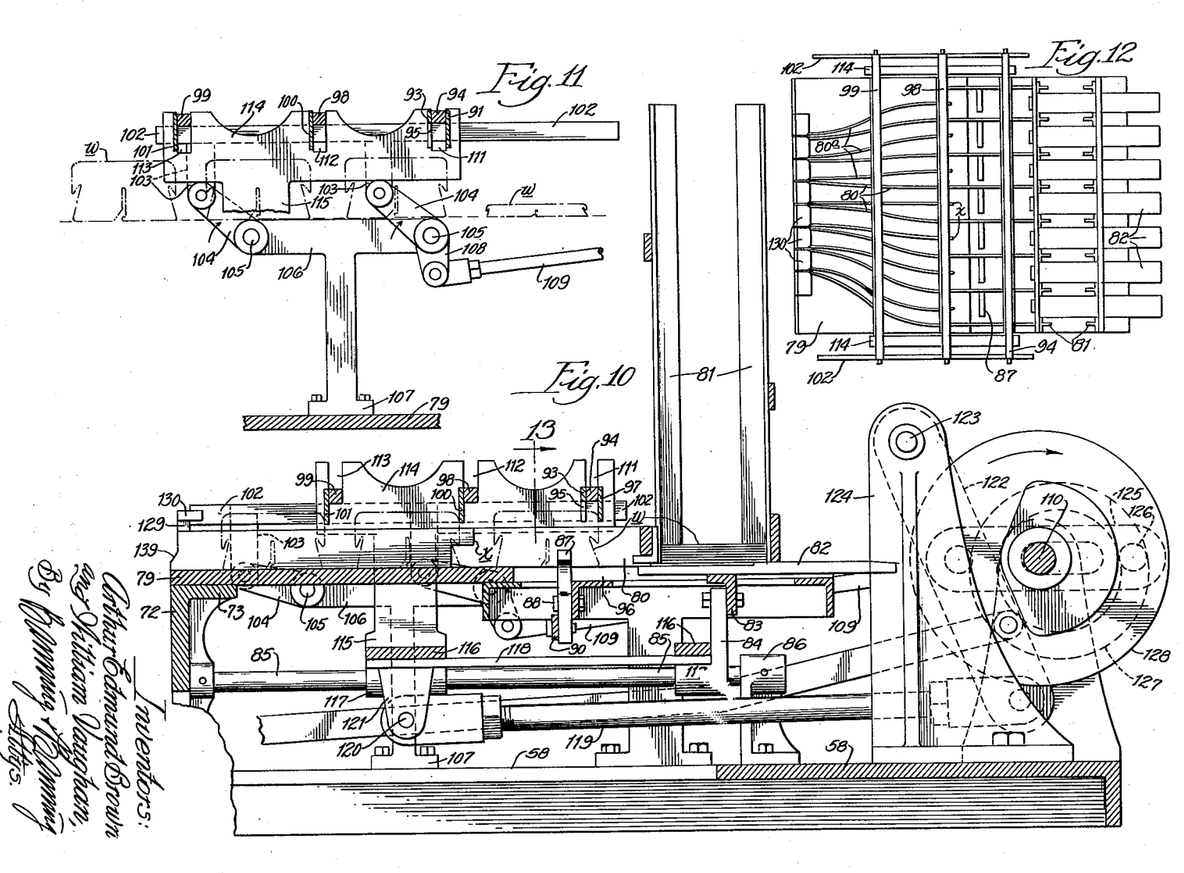
Fig. 10 is a cross sectional elevation taken on line 10 of Fig. 5, showing the mechanism for feeding and advancing the cross walls for insertion through the carton blanks.
Fig. 11 is a detail of a portion of the same mechanism in a different position of operation.
Fig. 12 is a plan view of the mechanism shown in Fig. 10.

The flange 73 supports a flat platform 79, which in turn has mounted thereon a series of pairs of guide plates, each pair comprising guide plates 80 and 80ª, standing edgewise, as shown in Fig. 12. Each pair of guide plates constitutes a guide or runway for one of the cross wall blanks, and the number of guides or runways thus constituted will be equal to the pairs of slots formed in the carton blank, and will thus determine the number of cross walls to be inserted during each assembling operation.

The guide plates of each pair are so spaced as to afford sufficient width at the outer end of the runway to permit the insertion flatwise of a cross wall blank, but as the guide walls approach the inner or delivery end, the walls converge toward one another, so that at the delivery end they are spaced in very close relation to one another to afford a narrow vertical slot for the edgewise delivery of the cross wall blank through the registered slot in the folded carton blank.

The guide plate 80ª of each pair is made shorter than its companion 80, so that at the outer or intake end the runways will be afforded only by the guide plates 80 standing in widely spaced relation to one another, as indicated in Fig.
12. Fig. 10 shows the point of termination of the guide plate 80ª, which is indicated by X. The guide plates 80 of the respective runways, at the intake end, stand in register with vertical corner walls 81 of cross wall hoppers (see Figs. 10 and 14), the number of hoppers being equal to the number of runways supplied therefrom. Each hopper is of a size to support a column of cross wall blanks laid flatwise, and the floor of the hopper is afforded by a slide plate 82 which is carried by a cross bar 83 supported upon standards 84 which ride upon guide rods 85 extending from the stop plate 72 to brackets 86 located beneath the hoppers.

In view of the fact that a group of aligned hoppers are utilized, the bar 83 should be of sufficient length to mount the slide plates for the entire series of hoppers, so that all will move in unison, and it will be understood that the feeding mechanism now being described is universal to the entire series of hoppers, so that a full set of cross walls will be advanced by stages and ultimately inserted as a set through the associated slots in the carton blank.

Figures 13, 15, 16:
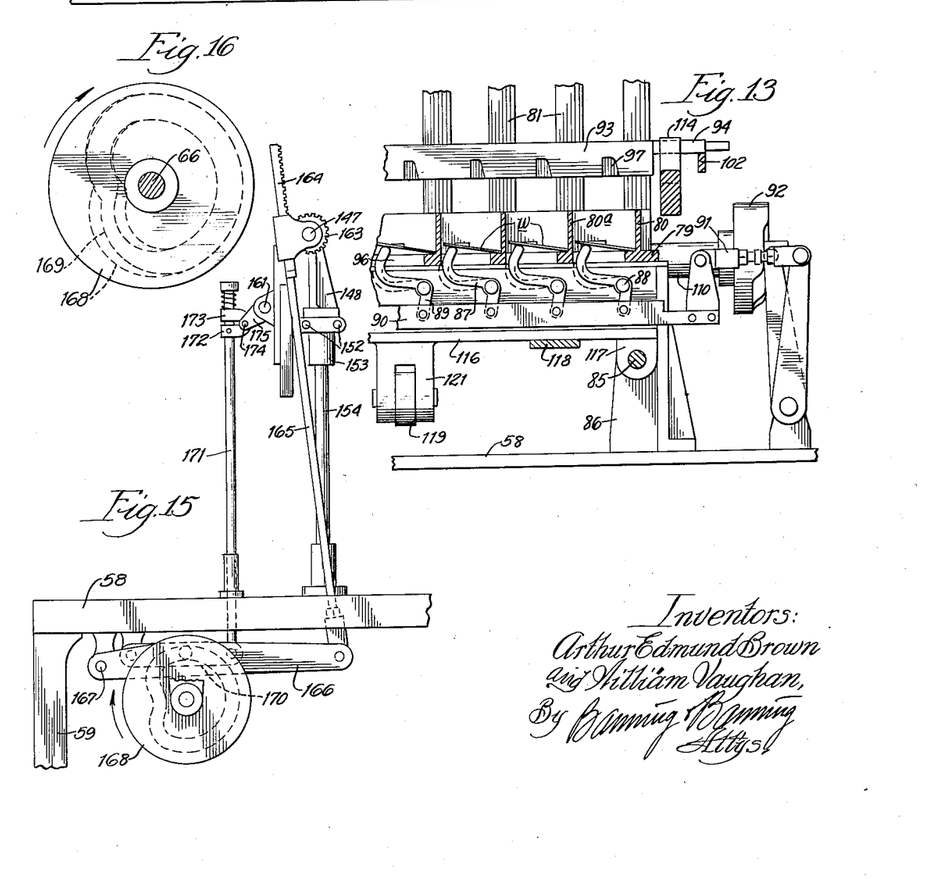
Fig. 13 is a cross section taken on line 13 of Fig. 10, showing the mechanism for upwardly tilting the cross walls.
Fig. 15 is a detail showing the cam and connections for operating the clamping mechanism for lifting the carton blanks after insertion of the cross walls, the same being viewed on line 15 of Fig. 5.
Fig. 16 is an enlarged detail of the same cam mechanism.
Figure 14:
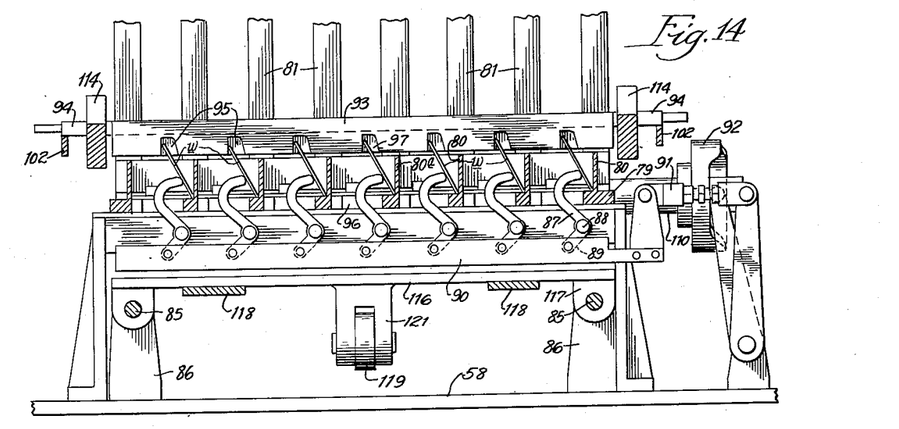
Fig. 14 is a similar view showing the parts in different position of operation.

The feeding movements of the respective slide plates 82 advance a cross wall blank from each of the hoppers and position the same flatwise between the guide plates 80 of the respective runways, and in order to lift the carton blanks into the upright position required for their discharge to the ends of the runways, the mechanism shown in Figs. 13 and 14 is provided. This mechanism comprises a group of fingers 87, each of which is mounted upon a pivot 88 and is provided with a tail piece 89, which tail pieces are pivoted to a universal draw-bar 90 actuated by a link 91 which is controlled by a double stepped cam 92, so that in the timed operation of the machine, the fingers will first be swung from the dotted line position shown in Fig. 13 to the full line position shown in that figure, and after an interval be again swung upwardly to the position shown in Fig. 14. These operations are so timed as to cause the initial uptilting movement of the cross wall blanks to occur immediately after the blanks have been fed inwardly by the reciprocation of the respective slide plates 82, and the initial uptilting of the blanks lifts them slightly from the respective side plates, so that on the recession of the slide plates the blanks will be held against withdrawal. Immediately thereafter, a more extended swinging movement of the fingers will cause the blanks to be upended into the titlted position indicated in Fig. 14, with their upper edges sufficiently lifted to to be engaged by the forward plate 93 of an outer feeding bar 94 which extends transversely of the entire group of runways and in position to engage the rear edges of the uptilted cross wall blanks preparatory to the initial step in the inward advance of the carton blanks by stages, as indicated in dotted lines in Fig. 10.

The forward plate 93 is provided with notches 95 into each of which the outer upper corner of a cross wall blank is received as the plate 93 is moved downwardly, and the notches are provided to positively engage the cross wall blanks and prevent them from falling back with the recession of the fingers 87 which operate through slots 96 in the platform 79.

The inner member 80ª of each pair of guide plates 80 terminates at the point X (see Fig. 10), so that in the initial uptilting of the cross wall blanks sufficient clearance will be afforded before the blanks are advanced to position to come within the compass of the more restricted runway afforded between the converging guide plates 80 and 80ª.

The feeding bar 94 is also provided with an unnotched outer feeding plate 97 which is adapted to engage the outer edges of the entire series of blanks when the same have been uptilted to the position shown in Fig. 14. The blanks are thus positioned in preparation for the initial advance of the outer feeding bar, which serves to move a set of blanks from the right-hand position indicated in dotted lines in Fig. 10 to the intermediate dotted line position indicated in the same figure. The outer feeding bar co-operates with an intermediate feeding bar 98 and an inner feeding bar 99, the three bars being parallel to one another and spaced at a distance somewhat in excess of the overall width of a cross wall blank.

The intermediate feeding bar is provided with a depending feeding plate 100, and the inner feeding bar is likewise provided with a depending feeding plate 101, the arrangement being such as to feed forward the sets of blanks by a step by step movement in which the three feeding bars advance and recede in unison through a four-way movement, which includes an inward advance of the three feeding bars while in lowered position to engage three sets of blanks, after which the bars will be lifted in unison to cause the feeding plates to clear the blanks on the outward or return movement of the respective bars. The mechanism for affording this four-way movement will now be described in detail.

The feeding bars 94, 98 and 99 extend transversely of the entire group of runways and are freely supported at their opposite ends upon lifting bars 102, which bars are supported upon depending standards 103—103, which in turn are pivoted to the outer ends of links 104—104, which links are pivoted upon pintles 105—105 carried at the outer ends of a T-shaped bracket 106, the lower leg 107 of which is bolted to the table 58. The outermost links 104 are provided with depending crank arms 108 to which are pivoted the inner ends of rocking arms 109, the outer ends of which are actuated by a cam on a shaft 110, which shaft also carries the cam 92. The rocking movements of the rocking arms, acting through the links 104, serve to give a rising and falling movement in unison to the bars 102 which support the feeding bars.

The ends of the feeding bars are guided within slots 111—112—113, formed at spaced intervals in guide plates 114 at each side of the group of runways, which plates are supported upon standards 115, which standards are connected by means of a cross plate 116, provided at its ends with sleeves 117 which ride upon the guide bars 85, and the plate 116 is connected with a similar plate 116 by means of strap bars 118. These strap bars are connected with the standards 84 which support the feeding slide plates 82, so that the group of slide plates 82 and the guide plates 114 all reciprocate in unison. This reciprocation is imparted by a pitman 119, the inner end of which is pivoted on a pintle 120 to a lug 121 depending from the cross plate 116, and the outer end of the pitman is pivoted to a rocking arm 122 hung on a pintle 123 carried by a standard 124. The arm is actuated by a link 125 which straddles the cam shaft 110 and is actuated by a roller 126 operating in a cam groove 127 in the face of a cam disk 128 on the shaft 110 (see Figs. 5 and 10).

As the cam shaft rotates, timed inward feeding movements will in unison be imparted to the entire group of feeding slide plates 82, and corresponding inward feeding movements will be simultaneously imparted to the feeding plates 97, 100, and 101, which latter, at this stage in the operation will be in lowered position to engage the rear edges of three sets of cross wall blanks, so that all will be advanced in unison to make room for the oncoming set of blanks concurrently being delivered from the respective hoppers. After the feeding movements have been consummated and before the recession of the parts occurs, the swinging fingers 87 will initially tilt the last delivered set of blanks to the position indicated in Fig. 13, after which the recession of the feeding mechanisms will occur.

On the restoring movement, the feeding bars 94, 98 and 99 will be lifted by the upswinging of the links 104, so that in this return movement the feeding plates will clear the tops of the groups of blanks just positioned and be stepped back into position to severally engage the next oncoming group of blanks in preparation for the next feeding movement. In this manner, the groups of blanks will be stepped off and intermittently fed forward, and as they advance will be more and more closely confined between the guide plates of the respective runways, so that the most advanced group of blanks will be accurately and closely guided into position to register with the slots in the folded carton blank which stands ready to receive them.

The feeding bars 94, 98 and 99, being freely mounted within the slots in the plates 114, will be permitted to rise and fall under the control of the linkage, but will be advanced and restored by the reciprocations of the plates 114, so that a four-way feeding movement or stepping off movement will be imparted, and the cross wall blanks will be advanced in rank formation and in timed relation to the positioning of the folded carton blanks.

In order to insure accuracy in the delivery of the cross wall blanks into the carton blank slots, the following mechanism is provided:

The guide plates 80—80ª of each runway are secured at their inner ends, and in very closely spaced relation, to spacer blocks 129 (see Figs. 7, 8, and 27), which extend upwardly above the guide plates, and each of which is provided with a head 130. The adjacent heads are spaced to afford narrow slots, through which the upper edges of the cross wall blanks are guided at the instant of delivery into the slots in the carton blanks.

In order to better assist in holding the carton blanks firmly in upstanding position during the inserting operation, a plurality of presser fingers 131 are provided, all of which are mounted upon and upstand from a universal bar 132, provided in each end with a lug 133, which is trunnioned into the inner end of a rocker arm 134. The presser fingers are spaced to bear against the face of the carton blank at points intermediate the slots therein, and each end of the bar 132 is provided with a roller 135, which on one side rides upon an inner rail 136 and on the other side rides upon an outer rail 137. Each rail 137 is turned inwardly at its upper end 138 to furnish a groove or runway for the roller, which when lifted to the position shown in Fig. 8 will ride upwardly and inwardly to deflect or offset the carton blank along a line of beveled shoulders 139 formed in the forward edges of the plates 80—80ª and the spacer blocks 129. This offsetting of the carton blank occurs through the line of slots formed therein, and facilitates the introduction of the cross wall blanks and their ultimate positioning with their lower edges in flush alignment with the folded base edge of the carton blank after the insertion of a set of cross wall blanks, in a manner to be presently described.

Each of the cross wall blanks is provided with a center slot $i$ which is beveled or throated at the corner $j$ in opposed relation to a short tongue $k$, which when the parts are assembled hooks through the associated notch $h$ in the folded base of the carton blank, and the bending or offsetting of the carton blank by the rolling up of the fingers 131 is to deflect the blank sufficiently to permit it to be lifted past the tongues $k$ and through the mouth of the slots $i$ without engaging the tongues $k$. This lifting movement of the carton blank is permitted by reason of the fact that the vertical slots in the carton blank are of greater length than the height of the cross wall blanks, so that while the latter are held stationary in a manner to be described, the carton blank may be lifted until the parts are so related as to permit the tongues to snap into the base notches without interference.

During the final movement, which inserts the cross wall blanks through the slots, the upper edges of the inserted group of cross wall blanks are engaged by a presser bar 140 (Figs. 7 and 8) which is carried at each end by a stem 141 terminating in a weight 142. The stems 141 pass through guide lugs 143 formed on the outer face of a vertically reciprocating cross plate 144, which is mounted to move from the lowermost position shown in Fig. 8 to the elevated position shown in Fig. 7.

Figures 5, 6:
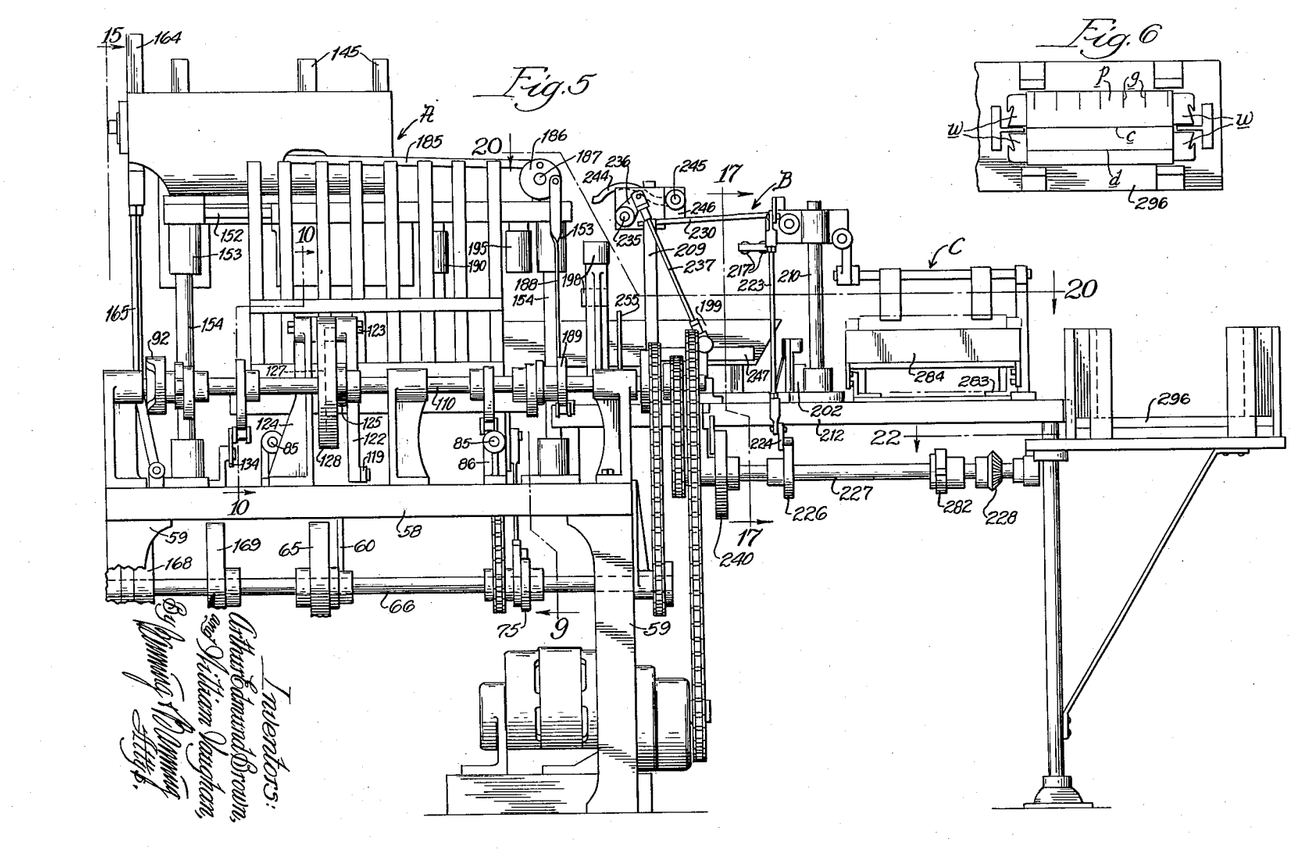
Fig. 5 is a side elevation of the mechanisms which are diagrammatically illustrated in Fig. 1.
Fig. 6 is a top or plan view of the stacker shown at the right of Fig. 5.

The reciprocating cross plate is provided at each end with a rack 145 meshing with a gear 146 on a shaft 147 journaled upon standards 148. The cross plate, at each of its side edges, is provided with a guide groove 149, which grooves engage vertical guide rails 150, each of which guide rails is supported from a bridge plate 151 carried by spaced tie rods 152 supported in head castings 153 which are carried at the upper ends of posts 154 spaced longitudinally of the machine, as shown in Fig. 5.

The vertical guide rails have depending therefrom a fixed prong 155, the inner faces of which align with the proximate upper margin of a carton blank on one side thereof to prevent lateral displacement of the same. Movable clamping fingers 156 are provided for clamping a carton blank against the cross plate 144. The clamping fingers are pivoted on pintles 157 carried by lugs 158 outstanding from and movable with the vertically reciprocating cross plate 144.

Figures 7, 8, 9:
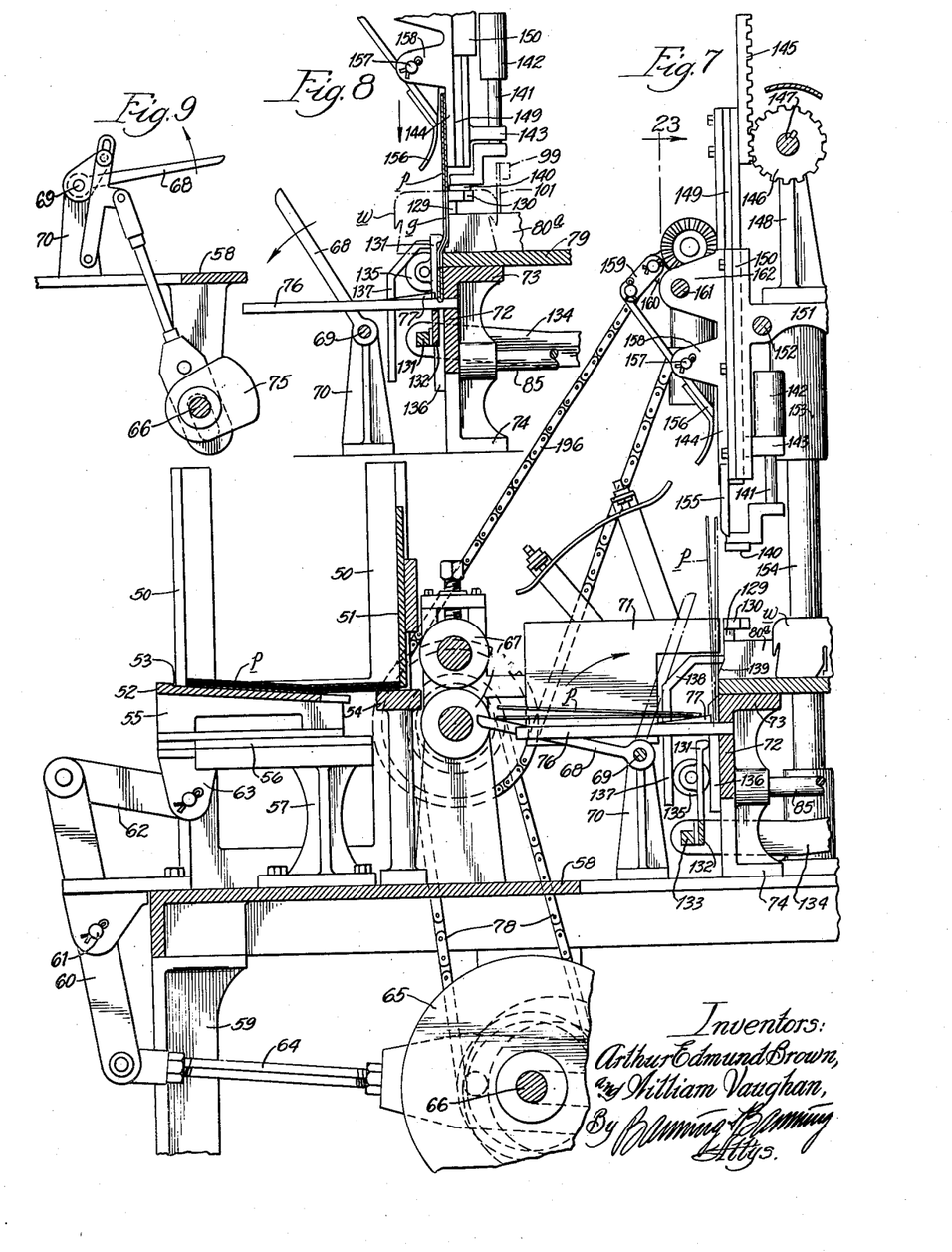
Fig. 7 is a cross sectional elevation taken through the assembling mechanism and showing the means for feeding the folded carton blanks into upstanding position to receive the cross walls.
Fig. 8 is a detail showing certain of the mechanisms of Fig. 7 in a different operating position.
Fig. 9 is a detail taken on line 9 of Fig. 5.

The movable clamping fingers 156 are flared outwardly to easily clear the upper edge of a positioned carton blank, as shown in Fig. 8, which illustrates the lowered position of the cross plate 144 with the movable clamping fingers in position when actuated to clamp the upper portion of the carton blank against the adjacent surface of the plate 144. Each of the clamping fingers at its upper end is pivoted to a link 159, which in turn is pivoted to the outer end of a short crank arm 160 outstanding from a rock shaft 161 journalled through lugs 162 outstanding from the cross plate 144. A slight rocking movement of the shaft serves to swing the lower ends of the fingers 156 into clamping position. Mechanism for actuating the clamping fingers is shown in detail in Fig. 15.

The shaft 147, which operates the racks 145 for vertically moving the plate 144, is provided with a pinion 163 which meshes with a rack 164 at the upper end of a rod 165 for imparting rotation to the shaft which through rack and pin connections imparts vertical movements to the plate 144 and the mountings for the clamping fingers. The lower end of the rod 165 is connected to the free end of a lever 166 pivoted at its outer end on a pintle 167 and actuated by a cam disk 168. The cam disk 169 actuates a lever 170 to which is pivoted a rod 171 carrying near its upper end a fixed block 172 and a spring-pressed block 173, which blocks between them engage a pin 174 on a crank arm 175 extending outwardly from the shaft 161.

Figures 22, 24, 25, 27:
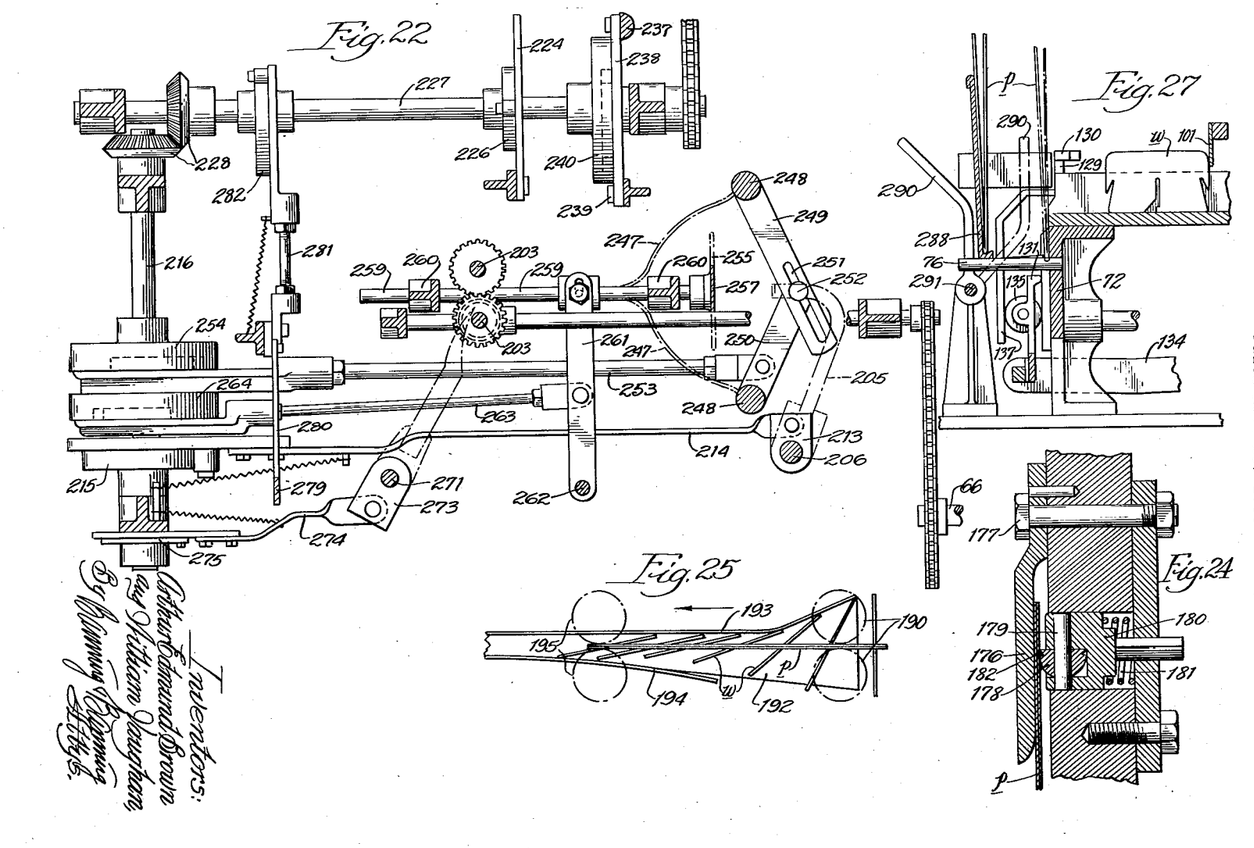
Fig. 22 is a plan view of the driving mechanism viewed from the plane 22—22 in Fig. 5.
Fig. 24 is an enlarged sectional detail taken on line 24 of Fig. 23.
Fig. 25 is an edge view of a carton blank in progress through the guideway which serves to progressively nest the cross walls on one another.
Fig. 27 is a sectional elevation taken on line 27 of Fig. 26.

The cam disks 168 and 169 are so configured as to operate the rods 165 and 171 in unison throughout the major portion of the range of movement imparted to the plate 144, so that during such movement no rocking action will be imparted to the rock shaft 161. At the lower terminus of the plate movement, however, the rod 171 will continue to move slightly, by reason of the cam configuration, and this terminal movement will rock the shaft 161 sufficiently to swing the clamping fingers 156 inwardly into clamping relation against the exposed face of the carton blank. With the clamping fingers thus engaged, the plate 144 will be lifted, thus elevating the carton blank while the weighted presser bar 140 continues to bear upon the upper edges of the cross wall blanks, so that the carton blank will be lifted and drawn or flexed around the shoulders 139 and under the compression of the presser fingers 131, and this movement will continue until the lower folded and notched edge of the carton blank has been lifted to the base plane of the transversely inserted cross wall blanks and into position to permit the tongue $k$ to snap into the notches $h$. At this point in the upward movement, the weight 142 is engaged by the lug 143 to lift the presser bar 140 from the heads 130, thus permitting the cross walls of the carton to be removed vertically from between the guides 80 and 80$^a$ and raised with the carton blanks to a height shown in Fig. 23, where the carton is gripped as shown in Fig. 24, after which the clamping fingers 156 will be released by the upward terminal movement of the rod 171 and the reverse rocking movement of the shaft 161.

Figure 23:
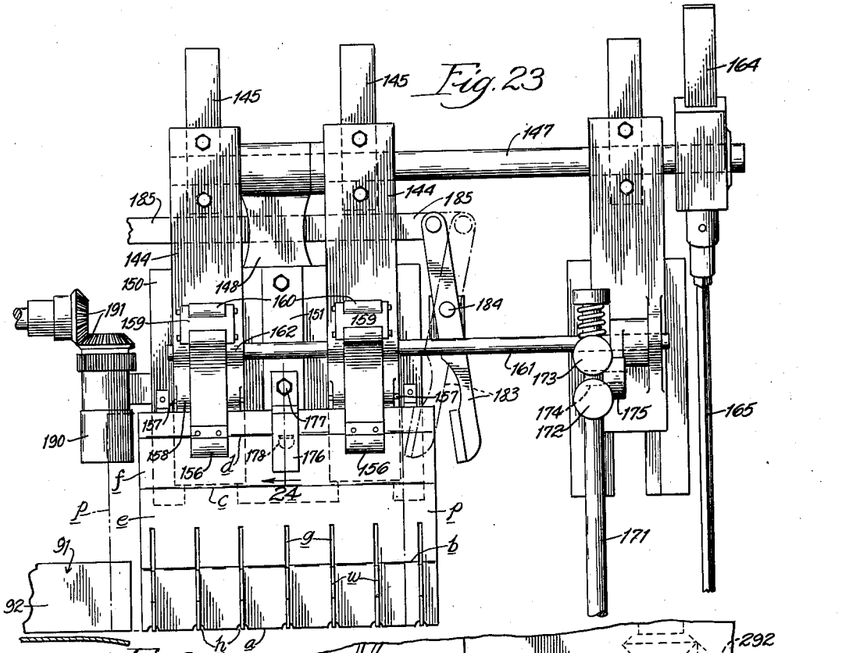
Fig. 23 is a vertical sectional elevation taken on the line 23 of Fig. 7, showing a folded carton blank with the inserted cross walls in position.

Simultaneously with the seating of the tongues $k$ in the notches $h$, the presser fingers 131 will move downwardly to release the base of the carton blank, permitting the blank with the inserted cross walls to be moved freely upward to the position shown in Fig. 23, but in order to suspend the blank in this position after the clamping fingers 156 are released from the blank, the fixed engaging finger 176 is provided. This finger is connected by a bolt 177 to the bridge plate 151, and is offset from the bolt to overhang the upper edge of the carton blank which is held between the engaging finger and the half ball roller 178 mounted on a pintle 179 carried by a block 180, which is spring-pressed by a spring 181. The exposed portion of the half roller is peripherally notched at 182 to afford an upwardly presented tooth which bears against the face of the carton blank with sufficient force to prevent displacement of the blank, but at the same time to permit it to be discharged edgewise from the assembling mechanism after the clamping fingers 156 have released it.

The discharge of the blanks from the assembling mechanism is effected by the mechanism particulary illustrated in Figs. 5 and 23, which will now be described. This mechanism comprises a kicker arm 183 pivoted on a pintle 184 and connected at its upper end to a draw bar 185, the opposite end of which is pivoted to a disk 186 mounted on a stub shaft 187 and oscillated by a vertically extending bar 188 actuated through suitable connections by a cam 189 on the shaft 110. At proper intervals, the kicker arm is swung from the full line position shown in Fig. 23 to the dotted line position, which serves to impel the lately assembled carton blank forwardly to the extent necessary to bring it into the bite of the vertical rollers 190 which are actuated by gearing 191.

The rollers are so placed as to engage the upper margins of the once folded blanks and carry them forward, and in so doing the inserted cross wall blanks are swept into the mouth of a converging runway 192 (see Fig. 25) having side walls 193 and 194. The side wall 193 is rearwardly extended and flared to sweep back the projecting ends of the inserted cross wall blanks and to lay them down on one another until they are sufficiently compressed to enter the space between the side walls 193 and 194, after which the blank is engaged by a second set of rollers 195 (see Fig. 20), which project inwardly through the walls of the converging runway 192. The rollers are actuated through driving connections 196 which are in train with the gear 191 for the first set of rollers. In order to properly guide the forwardly projecting ends of the inserted cross walls, a beveled shoe 197 is provided, which terminates at a point close to the bite of the rollers 195.

Figures 17, 18, 19:
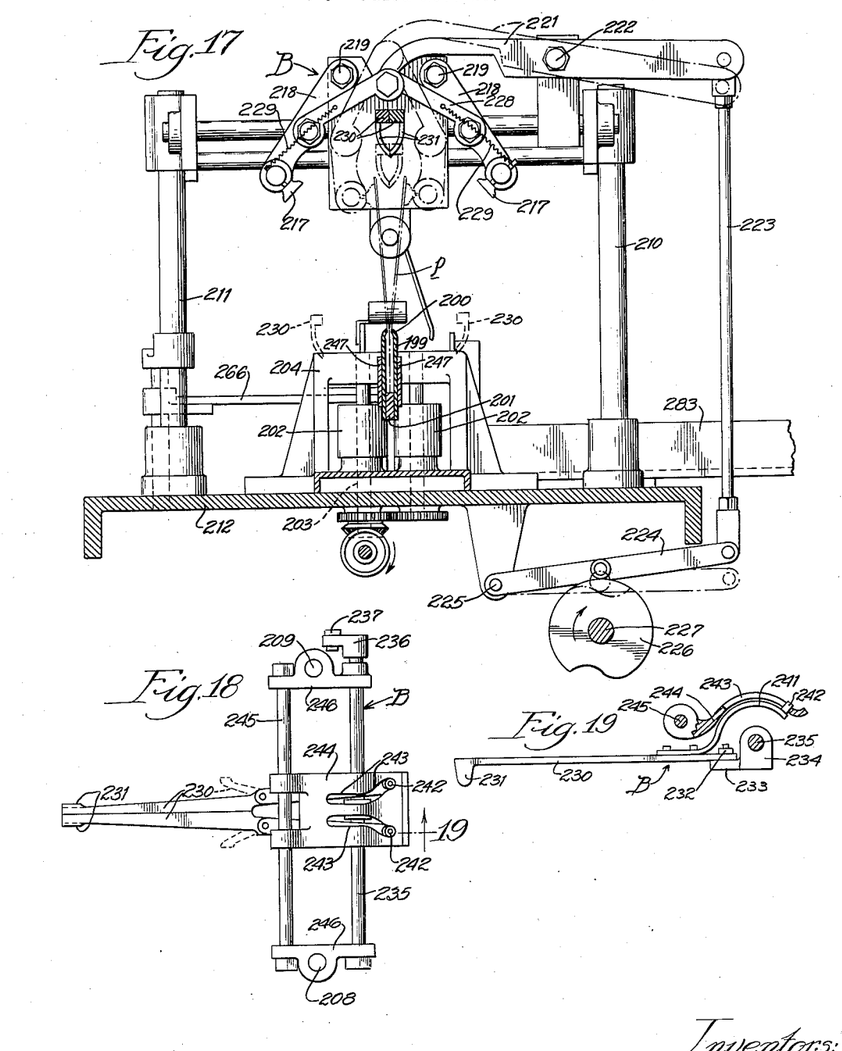
Fig. 17 is a cross sectional view of the mechanism for spreading the upstanding portions of the folded carton blanks in preparation for the final folding operation, the view being taken on line 17 of Fig. 5.
Fig. 18 is a detail plan view of the same mechanism.
Fig. 19 is a sectional detail taken on line 19 of Fig. 18.
Figures 20, 21:
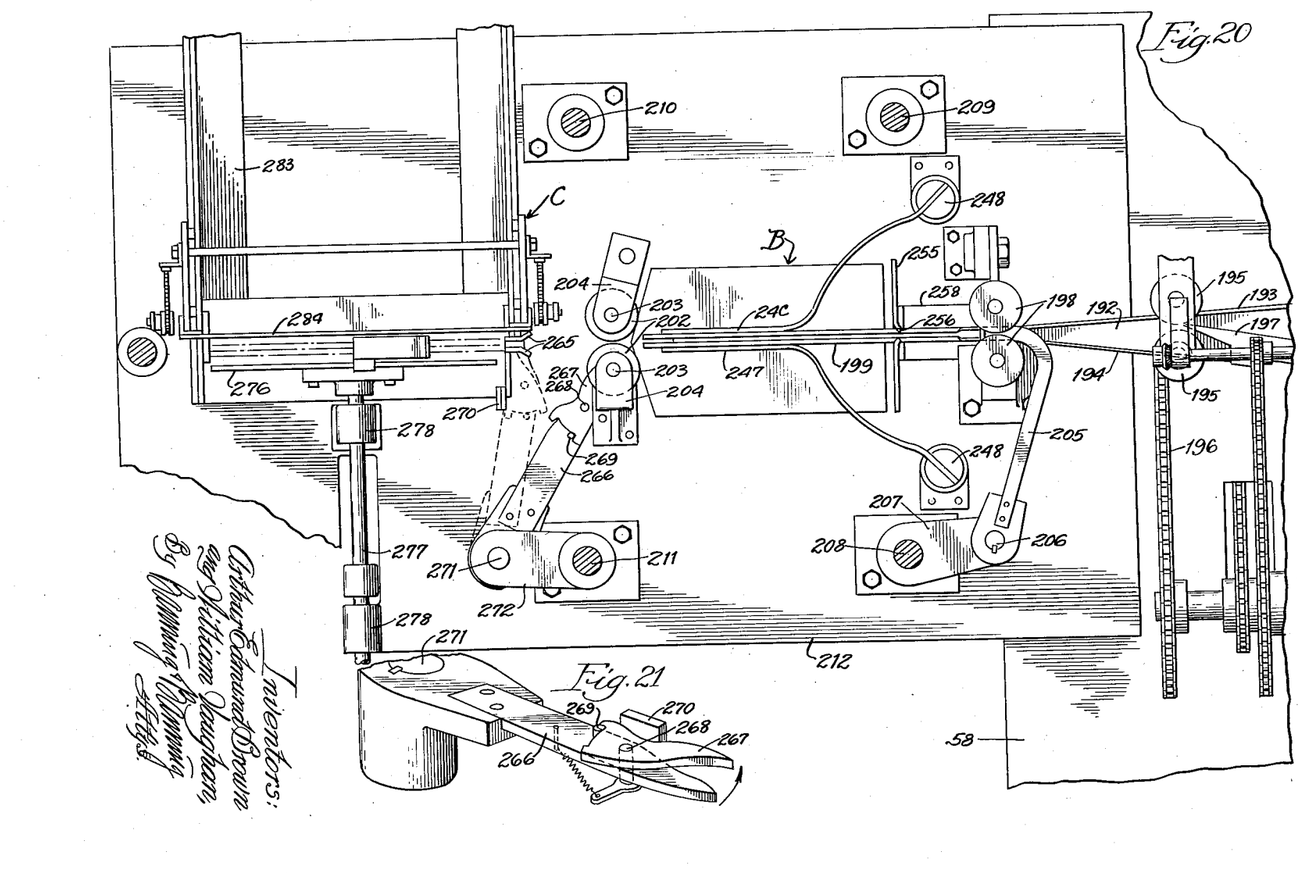
Fig. 20 is a plan view of the terminal portion of the machine, looking downwardly along the plane indicated by the line 20—20 in Fig. 5.
Fig. 21 is a perspective view of the kicker arm for forcing the folded cartons into the final stacker.

After the assembled blanks have been advanced by the roller mechanism above described, they enter the folding mechanism B, best illustrated in Figs. 17 and 20. Up to this point the carton blanks have been medially folded but once, but it now becomes necessary to fold down the upstanding walls along the score lines $b$, as illustrated in the third position of the carton in Fig. 2. The position of the score lines $b$ is such that when the upstanding wing portions of the carton blank are folded downwardly they will overhang and project below the base edges of the inserted and nested cross walls, and the mechanism now to be described is designed to effect this folding by three stages of operation, the first of which is performed by vacuum cups, which slightly spread the two walls of the blank to afford an opening for the entry of a folding blade, which descends between the blank walls and progressively spreads the same and ultimately down-folds them, after which a final folding mechanism compresses the downfolded wings into flatwise contact with the body of the carton and the cross walls assembled therein in preparation for the final delivery of the assembled and folded carton.

As shown in Fig. 20, the rollers 195 advance an assembled carton blank through the constantly converging runway until the base or body portion of the folded blank, with the compressed cross walls, is brought into the bite of power driven rollers 198 standing at a lower level to permit clearance of the wing portions when spread and bent. Beyond the rollers, the guide walls 193 and 194 come into closely convergent relation and extend parallel to furnish a restricted guideway 199, the upper edges of which are bent inwardly to afford lips 200, which constitute folding edges spaced far enough apart to permit the two contacting carton walls to pass between them, while affording a somewhat wider space for the passage of the body of the carton, which is distended somewhat by the inclusion of the folded down cross walls. The trough 199 at this point is closed at the base by a bottom plate 201 (see Fig. 17), and beyond the trough are located a pair of vertically standing rollers 202 mounted on vertical shafts 203 journalled at their upper ends within brackets 204. These rollers are positioned and spaced to engage the downfolded wing portions of the carton blank after the folding operation and after the wing portions have been folded down below the level of the body portion of the carton which rides along the bottom plate 201 of the trough.

The cartons are accurately positioned by the thrust of a kicker finger 205 mounted upon a rock shaft 206 journaled in part through a bracket arm 207 outstanding from a post 208 which is a companion to like posts 209, 210, 211, standing in cornerwise relation to one another and supported upon a table 212. The rock shaft 206 (see Fig. 22) is provided with a crank arm 213 which pivots a draw rod 214 actuated by a cam 215 on a cam shaft 216.

With a carton standing upright within the guideway 199, vacuum cups 217 swing inwardly, as shown in Fig. 17, to engage the upper margins of the two wing portions to initially draw them outwardly to the dotted line position shown in Fig. 17. The vacuum cups are respectively mounted upon swinging arms 218 pivoted upon pintles 219, and the two arms are connected by a toggle 220 which in turn is actuated by a lever 221 pivoted on a pintle 222 and operated by a rod 223 connected at its lower end to a lever 224 pivoted at 225, and actuated by a cam 226 on a cam shaft 227 which is in train through bevel gearing 228 with the cam shaft 216.

The members of the toggle are connected with the respective arms by springs 229, and the arrangement is such that as the arm 221 lifts, the toggle is broken and serves to swing the arms 218 inwardly to bring the vacuum cups into compressive contact with the opposite walls of the carton blank, after which a downward movement of the arm 221 serves to spread the arms and diverge the walls of the carton blank. Immediately thereafter, spreader arms 230 descend from the full line position shown in Fig. 17 to the dotted line position to bring the fingers 231 into position to engage the separated carton walls. The arms are widely spread and swung downwardly to continue the spreading and downfolding operation until ultimately the arms are brought downwardly into the dotted line position indicated in Fig. 17, which movement is of sufficient amplitude to fold down the wing portions of the carton blank over the folding lips 200 of the guideway in preparation for the final compressive folding action.

The spreader arms 230 are mounted in the manner shown in Figs. 18 and 19. The arms in initial position lie closely together, and each of the arms, at its rear end, is pivoted at 232 upon a lug 233 outstanding from a bracket 234, which is keyed upon a rock shaft 235 provided at one end with a crank 236 having pivoted thereto a draw rod 237, the lower end of which (see Fig. 22) connects with a lever 238 pivoted at 239 and actuated by a cam 240 on the cam shaft 227.

Each of the spreader arms is provided with an upstanding arcuate bracket 241 provided at its end with a roller 242 riding within an angular slot 243 in an arched plate 244 rigidly carried by a cross bar 245, the ends of which are anchored through bridge plates 246 supported upon the posts 208 and 209. The configuration of the angular slots 243 is such that as the spreader arms 230 are swung downwardly by the rocking of the shaft 235, the rollers 242 will follow the convergence of the slots 243 which will swing in the inner ends of the respective spreader arms at points beyond the pivotal mountings therefor, so that the outer or acting ends of the arms will be widely spread apart as the arms are swung downwardly, which will serve to open up and fold down the wing portions of the carton blank. With the wings thus downspread, they are in position to be finally folded by the action of folder fingers 247—247 (see Fig. 20), each of which is mounted upon a vertical rock shaft 248 and is of elbow formation with the two fingers, when closed, extending in convergent relation to one another, and with their acting ends in parallelism on either side of the trough 199, against which the ends abut when in closed position.

The two vertical shafts 248 (see Fig. 22) stand in opposed relation to one another, and are provided respectively with arms 249 and 250, which extend across one another and the former of which is slotted at 251 to receive a pin 252 upstanding from the arm 250. The arm 250 is actuated by a draw rod 253 operated by a cam 254 on the cam shaft 216, and the arrangement is such as to rock the shafts 248 oppositely and in unison to swing the folder arms 247 from a widely distended position to the closed folding position illustrated in Fig. 20.

With the cartons thus folded, they are ready for discharge, and such discharge is effected by the reciprocating movements of a thrust plate 255 which is slotted in its upper edge 256 to embrace the guideway 199. The lower edge of the thrust plate extends below the guideway and in position to engage the wing portions of the carton blank when folded over and down by the folding mechanisms previously described. The thrust plate 255 is carried by a vertical leg 257 (see Fig. 22) operating through a slot 258 in the table 212, which leg is carried by a slide rod 259, guided within brackets 260 and operated by a lever arm 261 pivoted at 262 and actuated by a draw rod 263 operated by a cam 264 on the cam shaft 216.

Since the carton is delivered into the guideway 199 in upstanding position, it clears the plate 255, but after the wing portions are turned downwardly they will lie in front of the plate so that the forward reciprocation of the plate will deliver the downturned wing portions of the carton blank into the bite of the rollers 202, which serve to advance it to the final stacker C (see Fig. 20). The stacker receives the folded cartons through a flared throat 265, and the thrust of the rollers is supplemented by the action of a kicker arm 266, having at its end a finger 267 pivoted at 268 and mounted to have a rocking movement which is limited by a stop pin 269. The finger 267 engages a stop 270 on the stacker C to completely advance the carton into the stacker in a manner shown by dotted lines in Fig. 20.

The kicker arm is mounted upon a vertical rock shaft 271, the upper end of which is journaled within a bracket 272, and the lower end of which carries a crank 273 (see Fig. 22) to which is connected a draw rod 274 actuated by a cam 275 on the shaft 216.

After the assembled cartons have been entered through the throat 265, they are acted upon by a plunger 276 carried by a plunger rod 277 guided within lugs 278 and operated by the upstanding leg 279 of an angle bar 280 (see Fig. 22), the inner end of which connects with a pitman 281 actuated by a cam 282 on the shaft 227. This serves to cause reciprocation of the plunger plate 276 to pack the folded cartons forwardly into a horizontal hopper 283 and against a plate 284 which yields as the stack is augmented by the incoming cartons.

The kicker arm 266 is provided with the spring pressed finger 267 to permit yielding of the finger as the arm is retracted, which prevents possible interference with an oncoming carton.

All of the mechanisms are operated in timed relation to one another to perform the operations described in their proper sequence, and to deliver the cartons in finally assembled and folded condition ready for removal.

Figure 26:
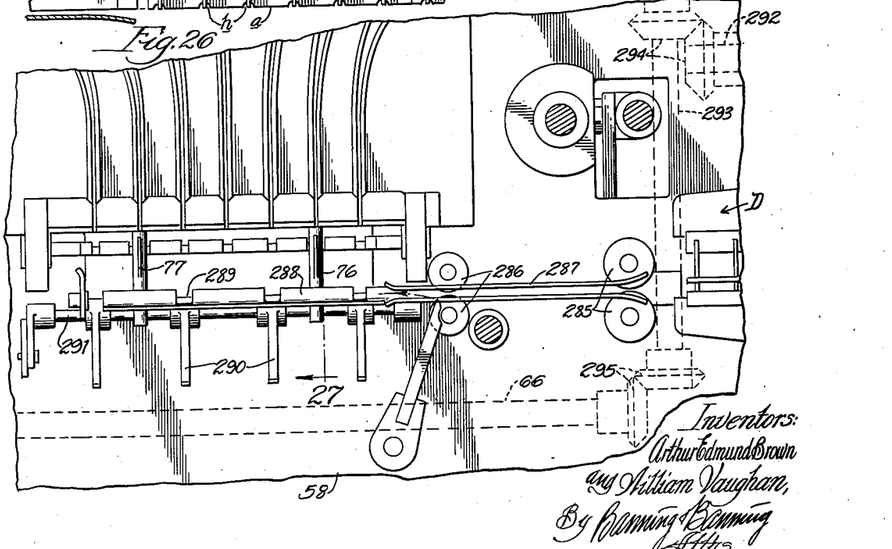
Fig. 26 is a plan view of the guides for feeding the cross walls edgewise toward the carton blank, and a modified arrangement for delivering blanks thereto.

In Figs. 26 and 27 we have shown a modified arrangement in which the mechanism above described is more intimately connected with a mechanism which performs the operation of die cutting the once folded carton blank, so that it is unnecessary to stack the carton blanks in the hopper 50 in flatwise position, and thereafter upend them preparatory to the insertion of the cross walls $w$.

In the simplified mechanism illustrated in Fig. 26, the blanks, after being die cut, are delivered directly from a die-cutting mechanism D to the inserting mechanism while still in upstanding folded position. For this purpose two pairs of forwarding rollers 285 and 286 are provided which serve to advance the blanks standing edgewise through a channel 287 to the mechanism for holding the blanks vertically edgewise while the cross walls are inserted. The channel 287 delivers the blanks standing edgewise in front of a plate or shoulder 288 (Fig. 27) which is provided with slots 289 to afford clearance for the operation of fingers 290 carried by a suitably actuated rock shaft 291 which serves to move the fingers 290 from the full line position to the dotted line position in Fig. 27, and to thus advance the blanks flatwise against the ends of the runways through which the cross walls are delivered. From this point onwardly the mechanism is in all respects similar to that previously described, and the operations involved are in all respects similar, so that further description is deemed unnecessary. The cam shaft 66 on the above described mechanism may be connected to a drive shaft 292 of the punch mechanism, by a shaft 293 having suitable bevel gears 294 and 295 so that the units are driven in timed relation.

The assembled and flat folded carton blanks accumulating in the horizontal hopper 283 (C) stand vertically on edge, and after a group of such stacked cartons has accumulated to the desired number, they are removed and stocked in uniform relation within a hopper 296. A second group is stacked in reverse relation, as indicated in Fig. 6, to equalize the accumulation of the complete stack in the required numbers, after which they are taped or otherwise bound and removed for shipment.

In operation the scored and punched carton blanks are successively fed from stack formation in the hopper 66, which is located on one side of the medial center of the assembling mechanism, in preparation for the reception of a set of cross wall blanks fed inwardly from the oposite side of the machine into position to register edgewise with the registering slots cut through the companion walls of the carton blanks. With the blanks exactly positioned and clamped to prevent displacement, and with their lower portions flexed by the action of the presser fingers 131 against the offset shoulders 139, the died slots in the carton blanks will exactly register with the ends of the runways through which a set of cross wall blanks are progressively advanced by the intermittent four-way movements of the feeding bars, so that the forward rank of the procession of cross wall blanks will stand ready to slip through the slots upon the next movement of the feeding mechanism without danger of jamming by reason of the narrow character of the slots through which the cross walls are projected.

As soon as a set of cross walls is projected through the slots in a carton blank, the blank is lifted while the set of cross walls is held against lifting, so that, as the carton blank is lifted, it will be flexed through the throated slots in the cross wall blanks and in position to clear the line of inwardly presented tongues $k$ on the cross wall blanks, until the notches in the base edge of the carton blank are presented to the tongues k, which permits the tongues to snap into the notches and thus lock the set of cross walls in position, which completes the assembling operation. Thereafter, the assembled carton is moved upwardly, removing the cross walls from the runways, whereupon the upper wing portions of the carton blank are released by the clamping fingers 156, and are advanced by the kicker arm 183 into the bite of the rollers 190 which engage the upper wing portions of the carton blanks and feed the blanks through the converging walls of the runway into the folding mechanism B. The upstanding wing portions of the blanks are thereupon initially spread by the action of the suction cups, and more completely spread by the swing of the spreader arms which fold down the respective wing portions on either side of the lips 200, and the wings are finaly folded to flatwise position and below the medial body portion of the carton blank by the action of the folder fingers 247. With the assembled carton blanks thus folded, they are ejected by the action of the thrust plate 255 and ultimately fed to and assembled within the stacker C.

Numerous modifications in detail may be incorporated into the mechanism without departing from the spirit of the invention; and it will be understood that in the claims appended hereto, it is the intention within the scope of each of the claims, to cover the invention either in the form shown or in any other form which substantially conforms to the principles of operation and to the method of handling and assembling the blanks hereinbefore described.

We claim:

1. The method of assembling cross walls in a folded carton blank having registering slots in each of the plies thereof, which consists in feeding forward the folded carton blanks in processional relation, in feeding a set of cross walls transversely of each blank for projection through the slots thereof, in thereupon shifting the carton blanks laterally of their line of travel, in pressing the cross walls down upon the blank into nested position concurrently with advance thereof, and in reversely folding each ply of the blank over the nested cross walls.

2. The method of assembling cross walls in a slotted carton blank which consists in feeding forward the blanks in processional relation, in feeding a set of cross walls transversely of each blank for projection through the slots thereof, in shifting the carton blanks relative to the cross walls in a direction which is lengthwise of the slots in the former, in pressing the cross walls upon the blank into nested position concurrently with advance thereof, and in reversely folding the carton blank to enclose the cross walls which are nested thereon.

3. The method of assembling cross walls in a folded carton blank having registering slots in each of the plies thereof, which consists in feeding forward the folded carton blanks in processional relation, in feeding a set of cross walls transversely of each blank for projection through the slots thereof, in pressing the cross walls down upon the blank into nested position concurrently with advance thereof, and in reversely folding each ply of the blank over the nested cross walls.

4. The method of assembling cross walls in a slotted carton blank which consists in feeding forward the blanks in processional relation, in feeding a set of cross walls transversely of each blank for projection through the slots thereof, in pressing the cross walls down upon the blank into nested position concurrently with advance thereof, and in reversely folding the carton blank to enclose the cross walls which are nested thereon.

5. In mechanism of the class described, folding mechanism for carton blanks including a guide member having closely spaced walls positioned to receive and hold the base body portion of a folded carton blank with the portions of the blank required to be additionally folded extending outwardly beyond the walls of the guide member and companion spreading members having their acting ends normally standing in the medial plane of the folded carton blank and movably mounted with respect thereto, and means for actuating said spreading members to cause the ends thereof to enter between the walls of the carton blanks and thereafter move to spread and bend the same along bending lines afforded by the edges of the guide member walls.

6. In mechanism of the class described, folding mechanism for carton blanks including a guide member having closely spaced walls positioned to receive and hold the base body portion of a folded carton blank with the portions of the blanks required to be additionally folded extending outwardly beyond the walls of the guide member and companion spreading members having their acting ends normally standing in the medial plane of the folded carton blank and movably mounted with respect thereto, and means for actuating said spreading members to cause the ends thereof to enter between the walls of the carton blanks and thereafter move to spread and bend the same along bending lines afforded by the edges of the guide member walls, and folding arms movable to engage the carton blank walls after spreading to complete the folding thereof.

7. The method of assembling carton blanks which consists in feeding the blanks singly and in once-folded condition with registering slots in the opposed walls of the blanks and maintaining them in assembling position, feeding a set of cross wall blanks transversely to the plane of the carton blanks and projecting the cross wall blanks edgewise through the slots in the carton blanks, and advancing the carton blanks singly and nesting down the cross wall blanks into flatwise overlapping relation during said advancement, spreading the walls of the carton blanks and folding them back to overlie the nested cross wall blanks on opposite sides thereof, and advancing the assembled and folded carton blanks edgewise to the point of delivery.

8. The method of assembling carton blanks which consists in feeding singly the once-folded carton blanks, having registering slots through the opposed walls and notches in the folded edge and bringing them to assembling position, transversely feeding a set of cross wall blanks having slots in their edges terminating in locking tongues, and projecting a set of cross wall blanks through the slots in the positioned carton blank, shifting the carton blank relatively to the set of cross wall blanks to cause the tongues in the cross wall blanks to engage and interlock with the notches in the folded edge of the carton blank, and advancing the carton blank with the assembled cross wall blanks and striking down the cross wall blanks into overlapping flatwise relation during such advancement.

9. The method of assembling carton blanks which consists in feeding singly the once-folded carton blanks, having registering slots through the opposed walls and notches in the folded edge and bringing them to assembling position, transversely feeding a set of cross wall blanks having slots in their edges terminating in locking tongues and projecting a set of cross wall blanks through the slots in the positioned carton blank, shifting the carton blank relatively to the set of cross wall blanks to cause the tongues in the cross wall blanks to engage and interlock with the notches in the folded edge of the carton blank and advancing the carton blank with the assembled cross wall blanks and striking down the cross wall blanks into overlapping flatwise relation during such advancement, and folding down the walls of the carton blank to overlie the overlapped cross wall blanks on opposite sides thereof, and delivering the assembled carton blanks.

10. In mechanism of the class described, the combination of means for feeding carton blanks singly and in flatwise relation, bending mechanism to which the blanks are fed, said bending mechanism comprising anvil members separated from one another to afford a medial gap, a base member below said medial gap, a presser member adapted to coact with the anvil members and including a medial blade member positioned to operate through the gap between the anvil members and toward the base member for bending the carton blank along a medial folding line to afford a V-shaped carton body portion and along lateral folding lines to afford outstanding wing portions, and mechanism for advancing the cartons singly from the anvil mechanism.

11. In mechanism of the class described, the combination of means for feeding carton blanks singly and in flatwise relation, bending mechanism to which the blanks are fed, said bending mechanism comprising anvil members separated from one another to afford a medial gap, each of said anvil members including a flat body portion and angularly disposed marginal portions and a reciprocable presser member comprising flat body portions coacting with the flat anvil portions and wing portions coacting with the marginal anvil portions, and the presser member including a centrally disposed blade adapted to operate through the gap between the anvil members, and a trough shaped plate located below said gap for coaction with said blade member for bending the carton blanks to afford a V-shaped body portion and bent-down wing portions.

12. In mechanism of the class described, the combination of means for feeding carton blanks singly and in flatwise relation, bending mechanism to which the blanks are fed, said bending mechanism comprising anvil members separated from one another to afford a medial gap, each of said anvil members including a flat body portion and angularly disposed marginal portions and a reciprocable presser member comprising flat body portions coacting with the flat anvil portions and wing portions coacting with the marginal anvil portions, and the presser member including a centrally disposed blade adapted to operate through the gap between the anvil members, and a trough shaped plate located below said gap for coaction with said blade member for bending the carton blanks to afford a V-shaped body portion and bent-down wing portions, and swinging fingers located on opposite sides of the anvil member and movable to engage and inwardly bend the marginal portions of the carton blank beyond the edges of the anvil members.

13. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blanks, gripper devices for shifting the carton blank relatively to the set of inserted cross wall blanks, and means for advancing an assembled carton blank and for nesting down the cross wall blanks into overlappings relation to one another during said advancement.

14. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blank, gripper devices for shifting each carton blank relatively to the inserted cross wall blanks, presser means for restraining the cross wall blanks against movement during said shifting operation, and means for advancing the carton blanks after assembling and striking down the inserted cross wall blanks into overlapping relation to one another during said advancement.

15. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blank, means for flexing the carton blanks laterally to offset the slotted portion thereof in preparation for the reception of the set of cross wall blanks, and means for advancing the carton blanks after assembling.

16. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blanks, gripper means for engaging the carton blank and shifting the same relatively to the cross wall blanks, and presser means for holding the cross wall blanks in fixed relation during said shifting movement.

17. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blanks, and means for shifting the carton blanks relatively to the inserted cross wall blanks, offset shoulders contiguous to the ends of the runways, and co-operating movable presser fingers for laterally flexing the carton blanks transversely to a line of slots to facilitate the positioning of the cross wall blanks within the slots.

18. In mechanism of the class described, the combination of means for singly feeding to assembling position carton blanks having formed therein a row of slots, a plurality of runways terminating respectively in alignment with the positions occupied by the respective slots in the carton blank, a plurality of cross wall feeding devices associated one with each of the runways for feeding a set of cross wall blanks to the runways, means for advancing the cross wall blanks through the respective runways and projecting a set of said blanks through the slots in the carton blanks, gripper means for engaging the carton blank and shifting the same relatively to the cross wall blanks, and presser means for holding the cross wall blanks in fixed relation during said shifting movement, offset shoulders contiguous to the ends of the runways, and co-operating movable presser fingers for laterally flexing the carton blanks transversely to a line of slots to facilitate the positioning of the cross wall blanks within the slots.

19. In mechanism of the class described, the combination of means for singly feeding to assembling position carton blanks having formed therein a row of slots, a plurality of converging runways terminating respectively in closely spaced guide walls affording narrow channels for the projection of cross wall blanks through the respective slots in a positioned carton blank, a feed hopper at the outer end of each of the runways and positioned to deliver cross wall blanks flatwise into the mouth of the associated runway, feeding means for each of the hoppers for feeding cross wall blanks to the associated runway from the base of a column of blanks within the associated hopper, tilting means in each of the runways for tilting the cross wall blanks toward edgewise relation within the associated runway, and feeding members common to all of the runways and adapted to step forward the sets of cross wall blanks in rank formation and intermittently advance them by ranks toward and through the slots in a positioned cross wall blank.

20. In mechanism of the class described, the combination of means for singly feeding to assembling position carton blanks having formed therein a row of slots, a plurality of converging runways terminating respectively in closely spaced guide walls affording narrow channels for the projection of cross wall blanks through the respective slots in a positioned carton blank, a feed hopper at the outer end of each of the runways and positioned to deliver cross wall blanks flatwise into the mouth of the associated runway, feeding means for each of the hoppers for feeding cross wall blanks to the associated runway from the base of a column of blanks within the associated hopper, tilting means in each of the runways for tilting the cross wall blanks toward edgewise relation within the associated runway, and feeding members common to all of the runways and adapted to step forward the sets of cross wall blanks in rank formation and intermittently advance them by ranks toward and through the slots in a positioned cross wall blank, said feeding members having a four-way movement and operating to engage the rear edges of the ranks of cross wall blanks on the advancing movement and to clear the cross wall blanks on the return movement.

21. In mechanism of the class described, the combination of means for singly feeding to assembling position carton blanks having formed therein a row of slots, a plurality of converging runways terminating respectively in closely spaced guide walls affording narrow channels for the projection of cross wall blanks through the respective lots in a positioned carton blank, a feeding hopper at the outer end of each of the runways and positioned to deliver cross wall blanks flatwise into the mouth of the associated runway, feeding means for each of the hoppers for feeding cross wall blanks to the associated runway from the base of a column of blanks within the associated hopper, tilting means in each of the runways for tilting the cross wall blanks toward edgewise relation within the associated runway, and feeding members common to all of the runways and adapted to step forward the sets of cross wall blanks in rank formation and intermittently advance them by ranks toward and through the slots in a positioned cross wall blank, said feeding members being in the form of a plurality of transversely extending plates and mountings therefor, the mountings including members having a reciprocating movement of advance and recession with relation to the runways and the members having a vertical movement with respect thereto to impart a four-way movement of advance and recession to the feeding plates to engage the outer edges of the cross wall blanks during the feeding movements and to clear the cross wall blanks on the return movement.

22. In mechanism of the class described, companion spreader arms positioned to enter between and spread the walls of a carton blank, a pivotal mounting common to the companion spreader arms and positioned to afford movement of the ends of the spreader arms inwardly within the medial plane of a folded carton blank and each of the spreader arms having its own pivotal mounting in a axial line transverse to the axial line of the common pivotal mounting, and guide members for the spreader arms for imparting spreading movements thereto upon their individual pivotal mountings concurrently with swinging movements of the spreader arms about their common pivotal mounting.

23. In mechanism of the class described, companion spreader arms positioned to enter between and spread the walls of a carton blank, a pivotal mounting common to the companion spreader arms and positioned to afford movement of the ends of the spreader arms inwardly within the medial plane of a folded carton blank and each of the spreader arms having its own pivotal mounting in an axial line transverse to the axial line of the common pivotal mounting, a controlling member carried by each of the spreader arms, and a guide plate provided with guideways, one for each of said controlling members, said guideways being configured to afford a spreading movement to the spreader arms upon the individual pivotal mountings as axes concurrently with a swinging movement of said spreader arms upon the common pivotal mounting as an axis.

ARTHUR EDMUND BROWN.
WILLIAM VAUGHAN.